United States Patent [19]

Nagai

[11] 4,365,272
[45] Dec. 21, 1982

[54] TELEVISION CAMERA APPARATUS HAVING AUTOMATIC GAIN-SELECTING UNIT

[75] Inventor: Kiyotake Nagai, Tokyo, Japan

[73] Assignee: Nippon Electric Co., Ltd., Tokyo, Japan

[21] Appl. No.: 227,325

[22] Filed: Jan. 22, 1981

[30] Foreign Application Priority Data

Jan. 23, 1980 [JP] Japan .................................... 55-6466

[51] Int. Cl.$^3$ ............................................. H04N 5/26
[52] U.S. Cl. ................................................. 358/228
[58] Field of Search ....................... 358/228, 209, 225

[56] References Cited

U.S. PATENT DOCUMENTS

| | | | |
|---|---|---|---|
| 3,518,371 | 6/1970 | Brooks | 358/228 |
| 3,555,181 | 1/1971 | Thommen | 358/228 |
| 4,050,085 | 9/1977 | Prince | 358/228 |
| 4,174,526 | 11/1979 | Geurts | 358/228 |
| 4,268,866 | 5/1981 | Rodgers | 358/228 |
| 4,300,167 | 11/1981 | Miller | 358/228 |
| 4,318,132 | 3/1982 | Machida | 358/228 |

*Primary Examiner*—Michael A. Masinick
*Attorney, Agent, or Firm*—Sughrue, Mion, Zinn, Macpeak & Seas

[57] ABSTRACT

A television camera is provided with an automatic gain selecting unit which is responsive to the iris value of the lens attached to the camera. The automatic gain selecting unit includes a comparator for determining when the camera lens-iris operates within a medium "window" range, a counter for counting upwardly or downwardly when the lens-iris operates outside of the window range, and a decoder for outputting a control signal to a gain selecting amplifier to adjust the gain thereof, in response to the operation of the counter.

5 Claims, 9 Drawing Figures

FIG. 3
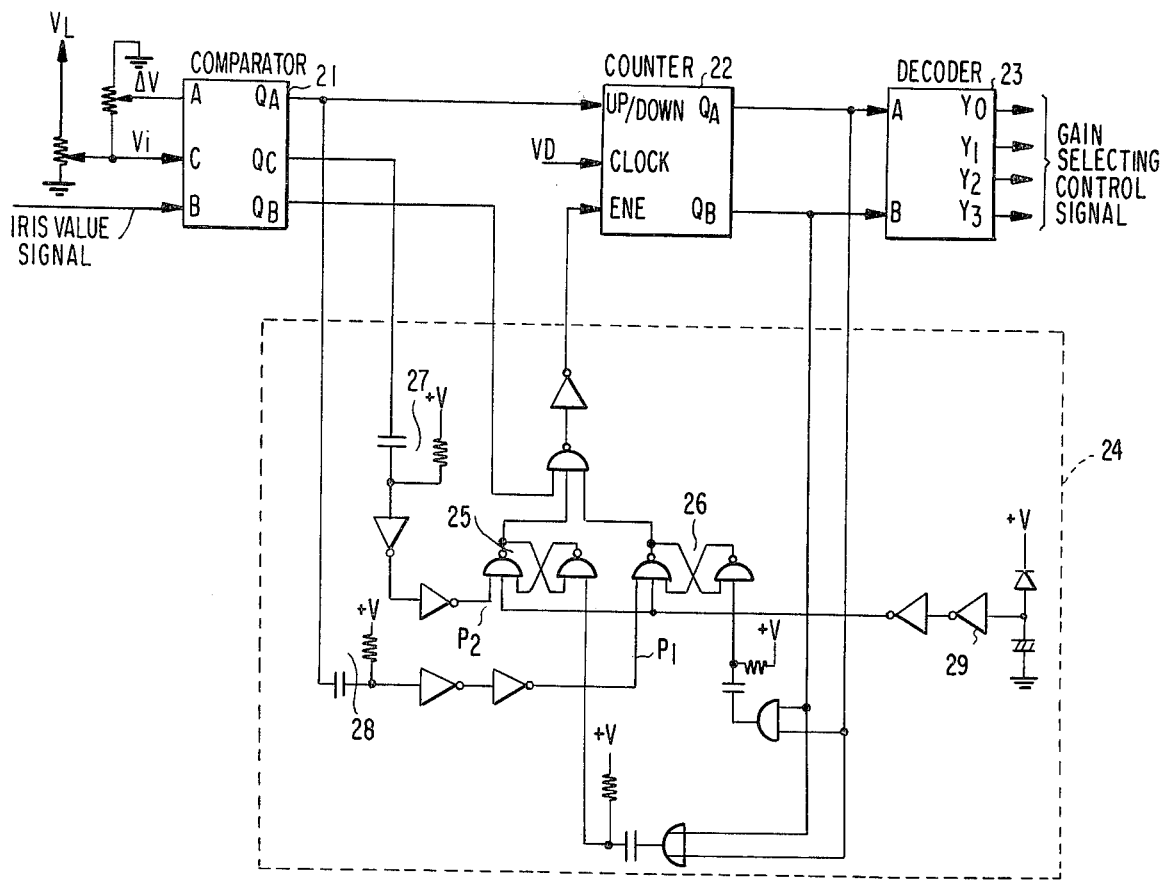
FIG. 4
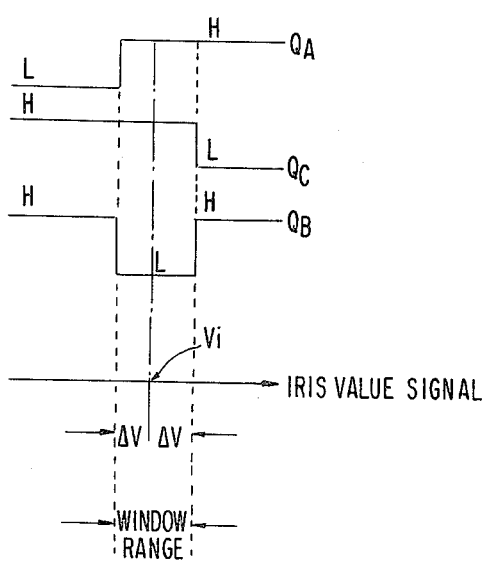
FIG. 5
| INPUT | | OUTPUT | | | |
|---|---|---|---|---|---|
| $Q_A$ | $Q_B$ | $Y_0$ | $Y_1$ | $Y_2$ | $Y_3$ |
| L | L | L | H | H | H |
| L | H | H | L | H | H |
| H | L | H | H | L | H |
| H | H | H | H | H | L |

TELEVISION CAMERA APPARATUS HAVING AUTOMATIC GAIN-SELECTING UNIT

BACKGROUND OF THE INVENTION

The present invention relates to a television camera apparatus and, more particularly, to a television camera apparatus having an automatic gain-selecting unit in which the lens-iris value is automatically servo-controlled in response to the level of a video signal picked up through an amplifying means from a pick-up-tube.

In the prior art television camera apparatus, a lens-iris value and the gain of a gain-selecting amplifier inserted in a video signal process (green channel video signal process in a three-tube color television camera apparatus) are controlled as follows: When the intensity of illumination from the object falls or increases, the lens-iris in opened to increase the video signal level or closed to decrease the video signal level. Furthermore, if the lens-iris is fully open and the intensity of illumination falls, an operator manually selects the gain of the gain-selecting amplifier in order to increase the video signal level for maintaining a predetermined signal level. On the other hand, if the lens-iris becomes fully closed and the intensity of illumination increases, he manually selects the gain of the gain-selecting amplifier in order to decrease the video signal level.

Practically, the characteristic of a lens, such as sharpness and contrast characteristics thereof depends on the lines-iris value, and the medium range of the iris value provides a better characteristic. For instance, the better sharpness and contrast characteristics of a lens having a maximum iris value of F.2.8 are delivered at a range of iris values between F.5.6 and F.8.

In the prior art television camera apparatus, the operator has to manually select the gain of the gain-selecting amplifier to maintain the medium range of the lens-iris value and the predetermined video signal level. However, the procedure of the manual controlling operation is difficult for the operator.

It is therefore an object of the present invention to provide a television camera apparatus having an automatic gain-selecting unit which automatically maintains the medium lens-iris value with the predetermined video signal level by selecting the gain of the gain-selecting amplifier, and therefore produces a good S/N ratio-and-contrast video signal.

According to the present invention, there is provided a television camera apparatus comprising a gain-selecting unit which selects the gain of the gain-selecting amplifier in response to the lens-iris value in order to maintain the medium range of the iris value.

BRIEF DESCRIPTION OF THE DRAWINGS

FIG. 3 is a circuit diagram showing one embodiment of an automatic gain-selecting unit shown in FIG. 2;

FIG. 4 illustrates the relation between input and output signals of a comparator;

FIG. 5 is a truth table illustrating a relation between inputs and outputs of a decoder;

Referring to FIG. 1, the control operation of the lens-iris and the gain of a gain-selecting amplifier in a prior art television camera apparatus will be described to help understanding the present invention. A servo-controlled lens device 1 includes an iris drive motor 2 for driving a lens-iris and a potentiometer 3 operable in response to the movement of the iris drive motor 2, i.e., iris-value. A video signal picked up from a pick-up means 4 containing a prism and a pick up tube is transmitted to an output-terminal, through a preamplifier 5, a pulse canceller 6 for eliminating a noise pulse in the blanking period, a gain-selecting amplifier 7, gain-variable amplifier 8, a clamper 9, a white-compression circuit 10, a gamma correction circuit 11 and an output-amplifier 12. Provided for the iris control are an iris control circuit 13, an iris control switch 14 for switching between automatic and manual controls, a manual adjustor 15 and a signal level detector 16. The iris control circuit 13 produces the driving signal for the iris drive motor 2 in response to the difference between the iris-comand signal derived from the switch 14 and the iris value signal from the potentiometer 3. The operation of the iris control circuit 13 is commonly known as a servo control. In a manual iris control mode, the signal from a manual adjuster 15 is selected by the switch 14 as the iris command signal, and in an automatic iris control mode, the output derived from the signal level detector 16 which detects the signal level at the output of the variable gain amplifier 8 is selected. In the gain-selecting amplifier 7, the gain is selected by moving a gain-selecting switch 17 to one of 0, +6, +12 and +18 (dB), for example. In the variable gain amplifier 8, the gain is controlled in a narrow range of about 3 (dB) in response to the control signal derived from a switch 19, in order to keep the video signal level substantially constant. The switch 19 selects the output of a potentiometer 19a in the manual mode or the output of a signal level detector 18 which detects the signal level at the output terminal, in the automatic mode. In practice, a small change in the illumination of the object picked up by the camera apparatus is compensated for by the operation of the variable-gain amplifier 8. However, a great change in the illumination, such as the change from daytime to evening, must be compensated for by the operation of the gain-selecting amplifier 7.

In FIG. 1, when the intensity of illumination of an object falls, the lens-iris automatically widens its opening to increase the amount of the light incident upon the image pick-up means, so as to maintain the predetermined signal level at the output terminal. If the lens-iris value slips out of the medium range according to the operation described above, the operator selects the gain-selecting switch 17 in order to return the iris value to the medium range.

Turning now to FIG. 2, which illustrates an embodiment of the present invention, the difference in the circuit arrangement shown in FIG. 2 from that in FIG. 1 resides in that the gain control of the gain-selecting amplifier is performed by an automatic gain-selecting unit 20 which is automatically driven by the iris value signal derived from the potentiometer 3, not by the operator. The explanation of the automatic gain-selecting unit 20 follows. In FIG. 3, which shows the detail of the automatic gain-selecting unit 20, a comparator 21 compares the iris value signal from the potentiometer 3 with pre-set voltages corresponding to the upper and lower limits of a predetermined medium range of the iris values, respectively. The range of the pre-set voltages expressing the predetermined medium range is defined as a window range. A 2-bit reversible counter (up-/down counter) 22 counts down when the iris value passes beyond the upper limit of the predetermined medium range and counts up when it goes below the lower limit. Furthermore, a vertical driving pulse is supplied to the counter 22 as a clock pulse. A decoder 23 responds to the output of the up/down counter 22 to supply gain-selecting information to the gain-selecting amplifier 7 (FIG. 2). A counter inhibiting circuit 24 inhibits the up/down counter 22 from counting when the iris value signal lies within the window range. Further, the counter inhibiting circuit 24 inhibits the up-/down counter 22 from further counting down when the count amount of the up/down counter 22 reaches the minimum count "00", and from further counting up when the count amount reaches the maximum count "11".

In the comparator 21, possibly using the IC "TCA 965" produced by Siemens Aktiongesellschaft, the voltages V and Vi expressing the predetermined medium range (Vi±ΔV) and the iris value signal are supplied to A and C input terminals and a B terminal, respectively. As shown in FIG. 4, when the iris value signal is lower than the lower limit of the window range, an output $Q_A$ of the comparator 21 is at a low (L) level, while when the former is higher than the latter, the output $Q_A$ is at a high (H) level. An output $Q_C$ of the comparator 21 is at the H level when the iris value signal is lower than the upper limit of the window range, while the output $Q_C$ is at the L level in the reverse case. Furthermore, an output $Q_B$ is at L level when iris value signal is within the window range and at H level when outside the window range.

The up/down counter 22 counts up according to the outputted L level of the comparator 21, and counts down according to the outputted H level except during the period when the output $Q_B$ of the comparator 21 is at L level. Outputs $Q_A$ and $Q_B$ of the counter 22 are coupled to input terminals A and B of the decoder 23, respectively. In the decoder 23, gain-selecting signals $Y_0$ to $Y_3$ are produced in response to the output $Q_A$ and $Q_B$ of the up/down counter 22 according to the truth table shown in FIG. 5. A counter inhibiting circuit 24 inhibits the up/down counter 22 from operating when the output $Q_B$ of the comparator 21 is at the L-level indicating that the iris value is within the medium range, or when the outputs $Q_A$ and $Q_B$ of the counter 22 are both at the H or L level. Such inhibiting operation is performed by supplying the L level to an enable (ENE) terminal of the up/down counter 22.

Figures 1, 2:
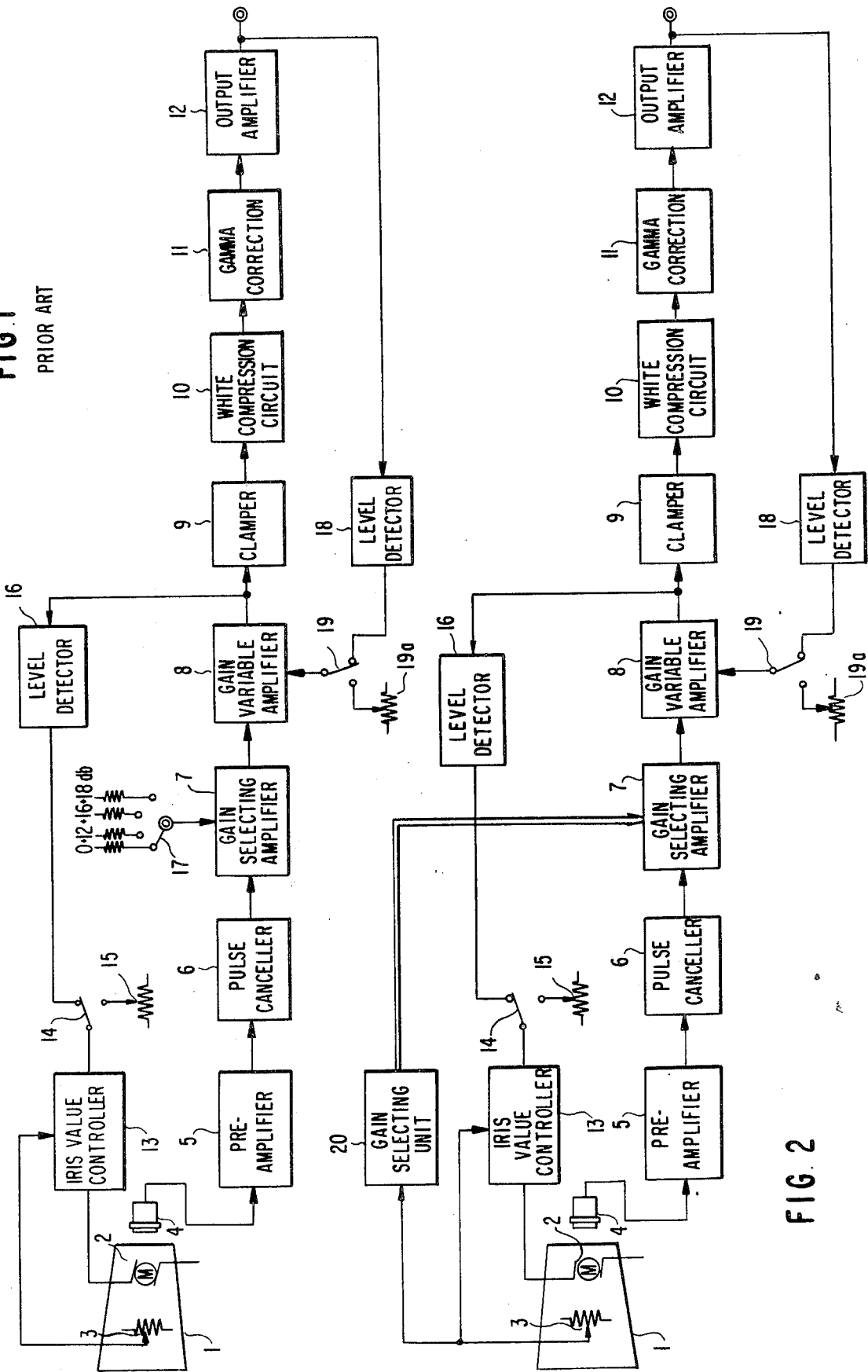
FIG. 1 is a schematic circuit diagram showing a prior art television camera apparatus.
FIG. 2 is a schematic circuit diagram showing an embodiment of a television camera apparatus according to the invention.
Figure 6A:
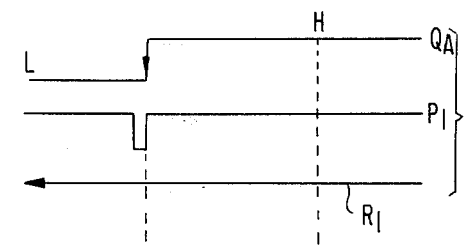
FIGS. 6(a), 6(b) and 6(c) are waveforms for explaining the operation of the counter inhibiting circuit shown in FIG. 3.
Figure 6B:
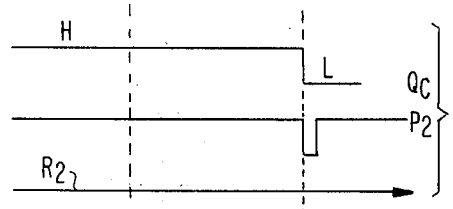
Figure 6C:
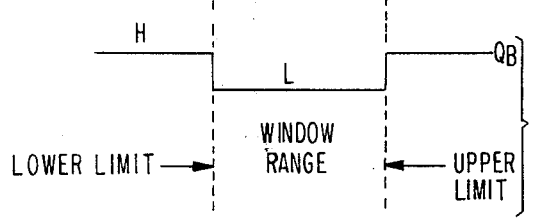

In the counter inhibiting circuit 24, except for the L level output $Q_B$ from the comparator 21, the signal for inhibiting the counter operation is derived through a flip-flop 25, when the outputs $Q_A$ and $Q_B$ of the up-/down counter 22 are both at the L level, and it derived through a flip-flop 26 when the outputs $Q_A$ and $Q_B$ of the up/down counter 22 are both at the H level. When the operation of the counter 22 is inhibited in the condition where the outputs $Q_A$ and $Q_B$ of the counter 22 are both at L level or H level, it is necessary to clear the inhibiting state by the change of the output $Q_A$ or $Q_C$ of the comparator 21. Such requirements is performed by providing differentiating circuits 27 and 28 between the output $Q_A$ of the comparator 21 and the flip-flop 26, and between the output $Q_C$ of the comparator 22 and the flip-flop 25, respectively. Furthermore, initial clearing circuit 29 clears the flip-flops 25 and 26 when power is supplied. FIGS. 6(a), 6(b) and 6(c) explain the clearing operation. FIG. 6(a) represents the output $Q_A$ of the comparator 21 and the clearing pulse $P_1$ at the input point $P_1$ of the flip-flop 26 generated according to the decrease of the iris value signal as indicated by the arrow $R_1$. FIG. 6(b) represents the output $Q_C$ and the clearing pulse $P_2$ at the input point $P_2$ of the flip-flop 25 generated according to the increasing of the iris value signal as indicated by the arrow $R_2$. Further, FIG. 6(c) represents the output $Q_B$ of the comparator 21 in both the cases described above.

Figure 7:
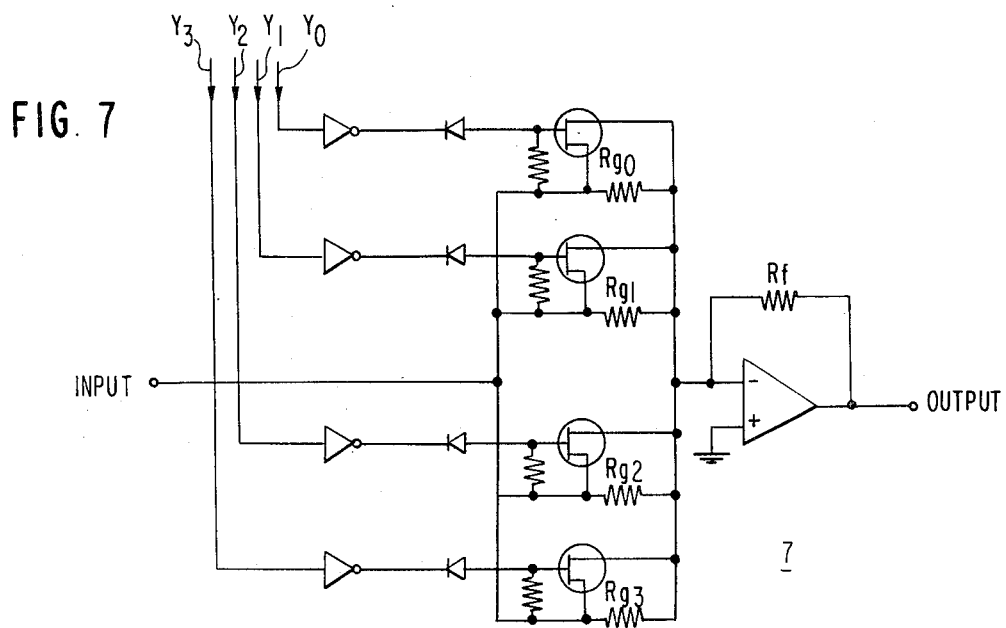
FIG. 7 is a circuit diagram illustrating the connection of the gain-selecting amplifier shown in FIG. 2 with the outputs of the decoder.

The outputs $Y_0$ to $Y_3$ of the decoder 23 are transferred to the gain-selecting amplifier 7 as an gain-selecting control signals. In FIG. 7, illustrating the connection of the outputs $Y_0$ to $Y_3$ to the gain-selecting amplifier, when the decoder output $Y_i$ is at the L level, the gain of the gain-selecting amplifier 7 is approximately $R_f/R_{gi}$(i=0 to 3).

What is claimed is:

1. A television camera apparatus comprising:
    a lens device including a servo-controlled lens-iris and means for producing a variable value signal according to the iris value of said lens-iris;
    pick-up means adapted to receive the light passed through said lens device for generating a video signal in response to said light;
    a gain-selecting amplifier for amplifying said video signal;
    means for detecting a signal level of the video signal amplified by said gain-selecting amplifier;
    means for controlling the iris value of said lens-iris in response to the signal level detected by said detecting means;
    means for determining whether said iris value signal lies within a range of predetermined levels corresponding to a predetermined range of iris values to produce an output when said iris value signal falls outside of said range of predetermined levels; and
    means for selecting the gain of said gain-selecting amplifier according to the output of said determining means such that said iris value signal goes back within said range of predetermined levels.

2. A television camera apparatus as claimed in claim 1, in which said selecting means is characterized by selecting the gain of said gain-selecting amplifier to increase the gain when the iris value signal passes across said range in a decreasing direction and selecting the gain of said gain-selecting amplifier to decrease the gain when the iris value signal goes beyond said range in an increasing direction.

3. A television camera apparatus as claimed in claim 1, in which said selecting means includes reversible counter means for counting up when said iris value signal has a level lower than said range of the predetermined levels and for counting down when said iris value signal has a level higher than said range; and
    decoder means receiving the output of said reversible counter means for producing a selection control signal to select the gain of said gain-selecting amplifier.

4. A television camera apparatus as claimed in claim 3, further comprising first inhibiting means for inhibiting the counting operation of said reversible counter means when said iris value signal lies within said range and second inhibiting means for inhibiting the counting operation when the output of said reversible counter means reaches its maximum or minimum amount.

5. A television camera apparatus as claimed in claim 4, further comprising means for clearing the inhibited state of said reversible counter means due to said second inhibiting means when said determining means determines that the level of said iris value signal changes such that it passes across said range and goes outside said range.

* * * * *